Aug. 7, 1962   P. L. DONOHO   3,048,351
SPIN STABILIZATION OF EARTH SATELLITES
Filed Aug. 11, 1959   2 Sheets-Sheet 1

INVENTOR
P. L. DONOHO
BY
ATTORNEY

United States Patent Office 3,048,351
Patented Aug. 7, 1962

3,048,351
SPIN STABILIZATION OF EARTH SATELLITES
Paul L. Donoho, New Providence, N.J., assignor to Bell Telephone Laboratories, Incorporated, New York, N.Y., a corporation of New York
Filed Aug. 11, 1959, Ser. No. 833,040
10 Claims. (Cl. 244—1)

This invention relates to earth satellites and more particularly to the orientation of earth satellites to be used in space as the repeaters of a radio communication system.

It has been proposed to provide radio communication systems operable at microwave frequencies and usable over distances far exceeding the usual line-of-sight limitation through the use of space satellite repeaters. One or more of these repeaters may be used to form line-of-sight links between terminal stations located on earth or even on other planets. One of the problems involved in the use of such earth satellite repeaters, whether they are passive repeaters which serve merely to reflect an incoming radio wave and redirect it in a predetermined direction, or so-called active repeaters which receive an incoming radio wave, amplify it, and reradiate it in a predetermined direction, is that involved in maintaining the spatial orientation of the antenna or reflector elements.

One proposal for maintaining the orientation of a repeater-borne antenna involves launching the repeater as a whole with an initial spin about the axis of greatest moment of inertia and with an initial orientation such that this axis is at right angles to the plane of the desired satellite orbit. A satellite body so launched will maintain the initial orientation, providing damping influences or other perturbations of the spin axis caused by inaccuracies in the launching do not cause the spin to degrade to such an extent that the gyroscopic action of the spinning body is lost. Obviously, antennas or reflectors mounted at the ends of the axis of greatest moment of inertia will maintain a fixed spatial orientation so long as the spin of the body continues about this axis.

Influences which may cause loss of such spin orientation include the effect of damping currents set up in the satellite by the earth's magnetic field in current loops, the planes of which intersect the desired spin axis. Currents flowing in such loops will cause torques about this spin axis which may add up to degrade the rotation of the body about this axis. Since it is impossible to construct either an antenna or a reflector which is not conducting and which does not, therefore, permit the flow of such damping currents, ultimate damping out of an initial spin is almost inevitable. Further, some evidence exists that the impact of micro-meteorites on the spinning satellite will also tend to degrade the initial spin. In addition to the above effects, any error in the launching of the satellite which induces an initial spin about any axis other than the axis of greatest moment of inertia will tend to cause precession of that axis and consequent loss of the desired orientation.

It is accordingly the object of the present invention to improve spin-oriented space satellited by reducing their susceptibility to the damping effects of eddy currents and their influences tending to degrade the spin of the satellite required to maintain a predetermined spatial orientation thereof.

In view of the above objects, there is provided in accordance with the invention, a space satellite adapted to be launched with an initial spin about the axis of greatest moment of inertia and with this axis normal to the plane of a desired orbit. Decay of the initial spin and subsequent loss of the desired orientation are prevented by providing means in the satellite for generating a magnetic moment rotating about the spin axis in a plane normal thereto with an angular velocity substantially equal to that desired for the satellite. This moment is produced in such a way that the torque acting about the spin axis is always that required to produce or maintain a desired angular velocity. In addition, means are provided for producing a damping force so directed as to resist motion of the satellite about any axis other than the desired spin axis.

In accordance with the invention, spin stabilization of an earth satellite to be used for a communication repeater is maintained by use of the earth's magnetic field. This field supplies an appropriate reference and also acts as a source of restoring torque such that the spin of an appropriately oriented satellite may be either maintained or accelerated. To this end, the satellite is equipped with means for producing therein a magnetic moment which rotates about the desired spin axis of the satellite (in this case the axis of greatest moment of inertia) and in a plane normal to this spin axis with an angular velocity equal to that required for stabilization of the satellite in space. A spin-stabilized satellite of this kind is disclosed in the copending application of C. C. Cutler, Serial No. 829,817, filed July 27, 1959, which is assigned to the assignee of the present invention.

As discussed in the application referred to above, the action of the magnetic moment provided in the satellite, as outlined above, may be most easily understood in connection with the so-called polar orbit in which the satellite is launched to travel in an orbit passing over the poles of the earth. It is well known that the earth's magnetic field may be considered equivalent to that produced by a single magnetic dipole located at the center of the earth and extending at an angle never exceeding eleven degrees to the polar axis of the earth. Such a dipole produces a field, the lines of force of which may be visualized as leaving the surface of the earth at one pole at a direction which is essentially vertical at that point and extending around the surface of the earth to re-enter again vertically at the other pole. At the approximate location of the equator, these lines are parallel to the surface of the earth.

From the above consideration of the nature of the earth's magnetic field, it will be seen that as a satellite travels about the earth in a polar orbit, it will encounter a magnetic vector representing this field, which varies only slightly in magnitude but which rotates at twice the angular velocity of the satellite in orbit. In addition, this vector is always in or nearly within the plane of the orbit, the lack of correspondence of the plane including the vector and that of the orbit being determined by accuracy of launching precession of the orbit with time and the discrepancy between the location of the geographical and magnetic poles of the earth.

It can be seen, then, if a satellite launched with an initial spin about the axis normal to the plane of this orbit is appropriately magnetized, it will seek the field direction which, as explained above, is just that effect required to maintain the axis of initial rotation normal to the plane of the orbit. In the absence of any other forces acting on the satellite, this effect would eventually produce an angular rotation about this axis equal to twice the rotation of the satellite in orbit. Further, it may be seen that if the satellite is provided with a magnetic moment rotating with respect to the satellite about the axis of initial spin and in the plane perpendicular to this axis, a resultant torque may be produced about this axis whenever this moment is normal to the direction of the earth's field and the torque will fall to zero whenever the moment is parallel to the earth's magnetic field. According to the invention, such a magnetic moment is produced in the satellite and is caused to revolve about the desired spin axis with an angular velocity equal to that desired for stabilization of the satellite in space. As the magnetic moment rotates with respect to the satellite, a resultant torque will tend to accelerate the satellite to such an angular velocity that the moment will be stationary with respect to an external frame of reference. When this occurs, the accelerating torque disappears and will reappear when the angular velocity of the satellite decreases sufficiently to require a further torque to restore the desired angular velocity.

As has been suggested above, magnetization of the satellite might produce a correcting torque. However, and in accordance with the disclosure of the above-identified application of C. C. Cutler, the satellite may be provided with means for generating a rotating magnetic moment of just the characteristics required to accelerate the satellite to a predetermined angular velocity. This is accomplished by the provision of one or more current loops located in planes which include the desired spin axis of the satellite and which are excited with alternating current, the frequency of which is related to the desired angular velocity. Such an arrangement requires that the satellite be provided with an oscillator for producing an exciting current of the requisite frequency and this oscillator, once designed, will always produce substantially the same frequency and output regardless of the need of the satellite for the administration of a restoring torque.

According to the present invention, the restoring torque is produced by alternating current, the phase, frequency, and amplitude of which are just those required to maintain a predetermined spin velocity. This is accomplished, as will be described in detail hereinafter, by measuring the earth's field as seen from the spinning satellite and producing a current which varies in frequency with the angular velocity of the satellite in orbit and with the spin velocity of the satellite about the chosen spin axis. After appropriate phase adjustment, this current is applied to one or more conducting loops, the planes of which are parallel to the spin axis of the satellite, and produces a torque which is maximum for angular velocities that are far removed from the desired spin velocity and which is zero at the desired velocity and is at all times in the direction required to bring the spin velocity to the desired value.

Although a single loop excited by a current generated as outlined above will produce a torque of the required amplitude, this may act about any axis parallel to the plane of the current loop. This ambiguity is resolved and the torque produced about a single predetermined axis by the use of at least two loops which are located in orthogonal planes the intersection of which includes or is parallel to the desired spin axis.

The above and other features of the invention will be described in the following specification taken in connection with the drawing in which.

Figure 1:
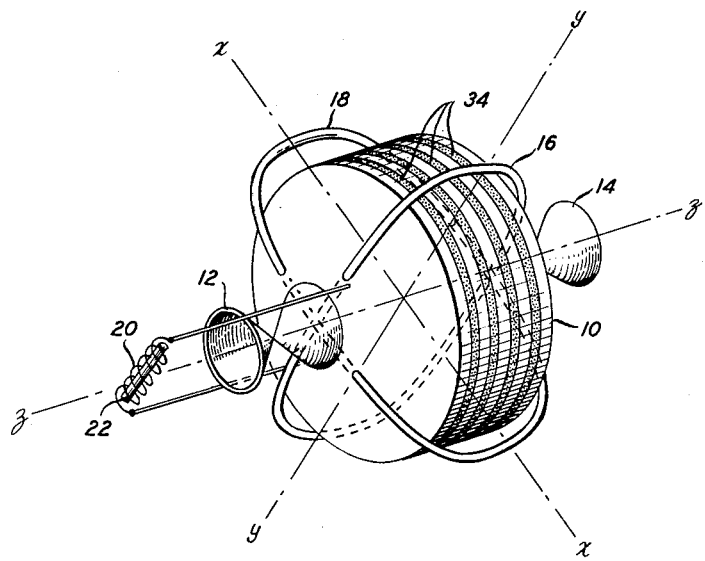
FIG. 1 is a perspective view of a space satellite arranged according to the invention to prevent decay of the stabilizing spin with which it is launched.

The satellite of FIG. 1 includes a generally cylindrical body 10 having conical ends and arranged to provide the greatest moment of inertia about the axis designated z. If such a satellite is launched with an initial spin about the z axis and with this axis normal to the desired orbital plane, the spatial orientation of the z axis will be maintained. Accordingly, antennas, here shown as biconical antennas 12 and 14, may be mounted on the ends of the satellite body and will be maintained with a fixed spatial orientation as the satellite travels in orbit. It will be understood, of course, that reflectors, dipole antennas, or combinations thereof, as well as any other desired form of antenna, may be mounted in corresponding locations and maintained in fixed orientation by the spin of the satellite.

Satellite 10 is provided with a magnetic moment through the use of orthogonal current-carrying loops 16 and 18 which intersect on the spin axis of the satellite. If a three-axis orthogonal reference system is constructed having $x$, $y$, and $z$ axes, as shown in the drawing, current loop 16 may be considered as mounted in the $y$—$z$ plane and current loop 18 as mounted in the $x$—$z$ plane. The product of the number of turns of wire in coils 16 and 18 multiplied by their respective areas is conveniently arranged to be the same for the two coils. If equal alternating currents of a frequency $\omega$ are supplied to coils 16 and 18 and adjusted to be in quadrature, the resulting magnetic moment will be in a plane normal to the $z$ axis, that is, in the $x$—$y$ plane and will rotate with an angular velocity $\omega$.

If the currents $I_1$ and $I_2$ applied to coils 16 and 18 are respectively $$I_1 = I_0 \sin \omega t \qquad (1)$$

$$I_2 = I_0 \cos \omega t \qquad (2)$$

the magnetic moment M of the satellite may be written in the $x$—$y$—$z$ coordinate system as having the following components:

$$M_x = I_0 A \cos \omega t \qquad (3)$$

$$M_y = I_0 A \sin \omega t \qquad (4)$$

where A represents the area of the coil. If, as required, the satellite is rotating initially about the $z$ axis, the net magnetic moment will rotate about this axis in the $x$—$y$ plane but will appear to be stationary with respect to an inertial frame of reference if the satellite rotates at an angular velocity $\omega$ equal to the angular frequency which appears in Equations 1 through 4. If the satellite is so oriented that the earth's field is totally in the $x$—$y$ plane, the magnetic torque may be written $$N_z = M_x B_y - M_y B_x \qquad (5)$$

where $B_x$ and $B_y$ are the components of the earth's field B along the $x$ and $y$ axes, respectively. This torque is maximum when the magnetic moments and the earth's field are at right angles and zero when they are parallel.

From the above, it will be seen that a torque acting in a direction to accelerate the satellite about the spin axis will exist so long as the angular velocity of the satellite is less than the frequency of the exciting currents and that when these two angular quantities are the same the torque will disappear when the moment of the satellite and the earth's field become and remain parallel.

If $\omega$ is taken as the angular velocity of the satellite about the spin axis at any particular time, the problem of maximizing the stabilizing forces involves making $\omega$ equal to $\omega_0$ which is taken as the desired angular velocity of the satellite. A torque appropriate to act in such a way as to make $\omega$ equal to $\omega_0$ is derived, according to the invention, by sensing the earth's magnetic field as seen from the spinning satellite, and a pick-up coil 20 is shown in FIG. 1 for this purpose. The turns of this coil are in planes parallel to driving coil 18. As pick-up coil 20, which may have a core of magnetic material 22, spins about the $z$ axis, an alternating current, the frequency of which depends upon the angular velocity $\omega$ of the satellite about the $z$ axis and the amplitude of which depends upon the earth's magnetic field at the location of the satellite as well as upon the angular velocity, is induced in the coil. If this output is amplified and applied to driving coil 18, the plane of which is parallel to that of the turns of the pick-up coil, a moment perpendicular to the earth's magnetic field will be produced. Because this moment is at all times perpendicular to the earth's magnetic field, a maximum torque tending to accelerate the satellite about an axis in the plane of pick-up coil 18 will be produced.

Figure 3:
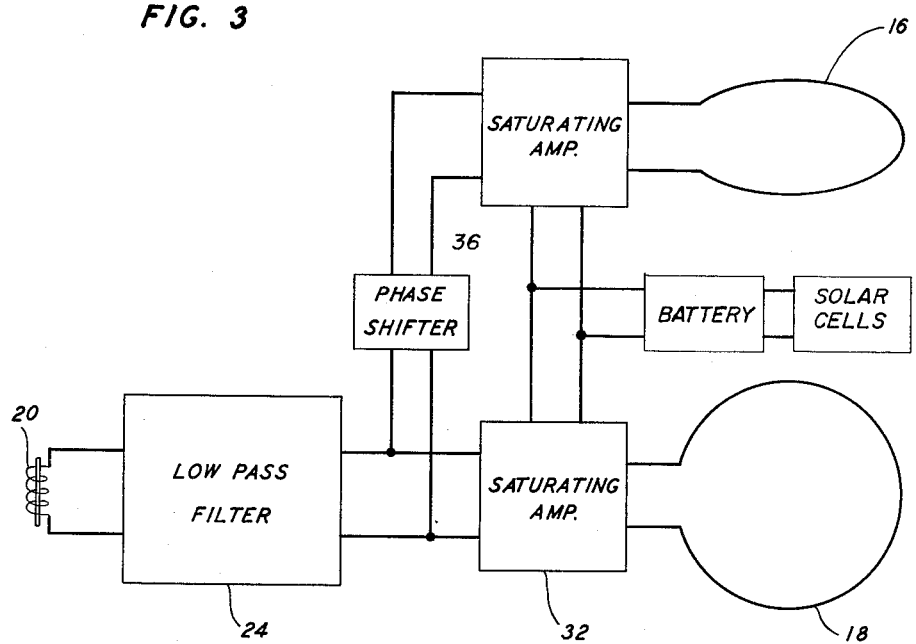
FIG. 3 is a schematic diagram of an alternative circuit in which a single current source is employed to energize a plurality of current loops.

It will be noted, however, that this torque may not necessarily be about the desired spin axis. This ambiguity may be resolved by providing the second driving coil shown as 16 in FIG. 1 with a current excitation derived from pick-up coil 20, or otherwise varied in the same way as that applied to driving coil 18 but with a constant ninety degree phase difference with respect to the current in driving coil 18. As suggested, this second exciting current may be derived from pick-up coil 20 through the action of a simple phase shifter 36 (FIG. 3) or it may be desirable to provide a second pick-up coil mounted for rotation about the z axis of the satellite but having its turns in planes parallel to driving coil 16 rather than driving coil 18, as is the case with pick-up coil 20.

It has been stated heretofore that if the output of pick-up coil 20 is applied to driving coil 18, the phase relationships are such that a maximum torque will be produced about the z axis. Obviously, it is necessary to employ amplification between the pick-up coil and the driving coil if the torque produced is to be sufficient to have any acceleration effect in maintaining the angular velocity of the satellite. Since, however, the arrangement thus far described would tend to accelerate the satellite indefinitely, angular velocities far in excess of those required for adequate stabilization would be produced with consequent large currents flowing in the driving coils. Since such currents would impose undesirably large requirements upon the power supply for the amplifier, it is desirable to so adjust the restoring or accelerating torque as to bring the satellite to a desired angular velocity and then to maintain this velocity by supplying additional torques in either the direction to accelerate or that to decelerate the spin of the satellite about the spin axis.

Figure 2:
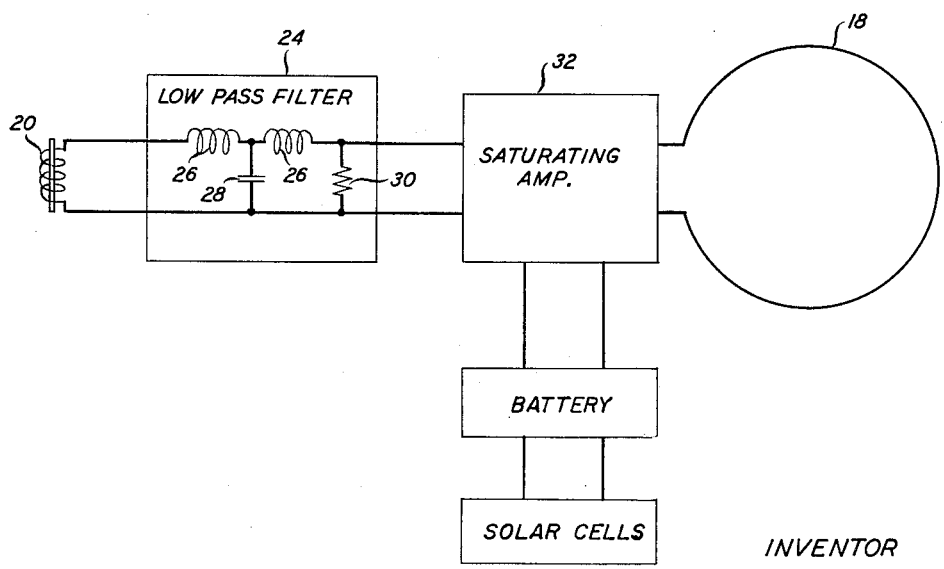
FIG. 2 is a schematic diagram of the circuit arrangement according to the invention for maintaining the spin stabilization of the space satellite of FIG. 1.

The electrical circuit arrangement necessary to accomplish this end is shown schematically in FIG. 2 for pick-up coil 20 and driving coil 18. Essentially, the current generated in the pick-up coil is acted upon by elements which produce therein a phase shift proportional to the frequency of the current, this phase shift being so chosen that a total phase shift of ninety degrees is produced when the angular velocity $\omega$ of the satellite matches $\omega_0$, the desired angular velocity. When this matching relationship obtains, the phase shift at ninety degrees is just sufficient to reduce the torque about the spin axis produced by driving coil 18 to zero. Further, if the matching relationship is exceeded for some reason and the spin is accelerated to an angular velocity greater than that desired, the action of phase shifter 36 is such as to reverse the torque so that the tendency will be to decelerate the spin of the satellite.

Conveniently, the requisite phase shift may be produced by a simple low-pass filter 24 comprising series inductor 26 and shunt capacitor 28, together with terminating resistor 30. These components are so chosen that the cut-off frequency $\omega_c$ of the filter is equal to $2\omega_0$. The output of the filter is applied to an amplifier 32 and the amplified quantity is applied to the driving coil.

A further increase in efficiency may be obtained by proper design of amplifier 32. This amplifier conveniently derives its operating currents from solar batteries disposed on the surface of the satellite and any reduction in the total current required reduces the drain upon this current source. Since the maximum torque is required at low angular velocities, and since the output of the pick-up coil is proportional to the angular velocity, it is necessary to provide maximum gain only for low input to the amplifier. As the satellite accelerates about the spin axis, the output of the pick-up coil increases substantially and less and less amplifier gain is required. Thus amplifier 32 may be a saturating amplifier, the maximum gain of which occurs an angular velocity of the satellite less than that desired. Therefore, for most operating conditions, the amplifier serves merely to direct the currents through the driving coil in a direction determined by the sign of the voltage occurring at the output of the phase shifter (sign here being taken as an indication of the relative phase).

While the pick-up coil may be of any of a large number of structural types, it is found that a coil having a thousand turns wound upon a Permalloy core one-tenth of an inch in diameter and five inches long is capable of producing an output potential, when rotated with an angular velocity $\omega$ in the earth's magnetic field, of $\omega$ millivolts. This output is obviously sufficient to serve as a source of stabilizing torque for the satellite.

It will be obvious from the above that any desired number of driven current loops may be employed providing that appropriately phased currents are applied thereto. Although the arrangements described will serve to maintain the angular rotation of the satellite about the desired axis, perturbing forces of one kind or another may be applied to the satellite in such directions as to tend to rotate the spin axis and to cause precession of the satellite. Such forces may, as has been suggested above, be due to micrometeorite collisions, inaccuracies in initial spin or initial orientation of the satellite, or due to the presence of unwanted eddy currents. According to the invention, such disturbing influences are minimized by causing appropriate damping of angular rotations of the satellite about any axis other than the desired spin axis. As shown in FIG. 1, for example, this is accomplished by the provision of a plurality of conducting bands 34 encircling the body of the satellite normal to the desired spin axis. These bands form closed current loops in which eddy currents are induced by the earth's magnetic field. The resultant magnetic moments are in a direction appropriate to damp out rotations of the satellite about any axis other than the desired spin axis. Alternatively, such damping may be produced by an appropriately oriented tube of liquid mounted within the body of the satellite and arranged to damp out precession by flow within the tube.

What is claimed is:

1. In a space satellite to be launched with an initial spin about the axis of greatest moment of inertia and with said axis normal to the plane of a desired orbit, means for maintaining the spin of said satellite despite damping influences comprising a pair of current-carrying loops mounted on said satellite in planes which intersect in a line parallel to said spin axis, means for sensing variations in the earth's magnetic field experienced by said spinning satellite and generating a current proportional thereto, and means for applying said current to said loops to produce a torque about said spin axis.

2. In a space satellite to be launched with an initial spin about the axis of greatest moment of inertia and with said axis normal to the plane of a desired orbit, means for maintaining the spin of said satellite despite damping influences comprising a pair of current-carrying loops mounted on said satellite in planes which intersect in a line parallel to said spin axis, means for sensing variations in the earth's magnetic field experienced by said satellite and generating a current proportional thereto, means for shifting the phase of said current in proportion to the frequency thereof, and means for applying said phase-shifted current to said loops to produce a torque about said spin axis.

3. In a space satellite to be launched with an initial spin about the axis of greatest moment of inertia and with said axis normal to the plane of a desired orbit, means for maintaining the spin of said satellite despite damping influences comprising a pair of current-carrying loops mounted on the satellite in orthogonal planes intersecting on the spin axis of said satellite, means for sensing variations in the earth's magnetic field experienced by said spinning satellite and generating a current proportional thereto, means for shifting the phase of said current in proportion to the frequency thereof, and means for applying currents proportional to said phase-shifted currents and in quadrature with each other to the orthogonal loops.

4. In a space satellite to be launched with an initial spin about the axis of greatest moment of inertia and with said axis normal to the plane of a desired orbit, means for maintaining the spin of said satellite despite damping influences comprising a pair of current-carrying loops mounted on the satellite in planes which intersect on said spin axis, means for sensing variations in the earth's magnetic field and producing quadrature currents proportional thereto, and means for applying said quadrature currents respectively to said current-carrying loops to produce a torque about said spin axis.

5. In a space satellite to be launched with an initial spin about the axis of greatest moment of inertia and with said axis normal to the plane of a desired orbit, means for maintaining the spin of said satellite despite damping influences comprising a pair of current-carrying loops mounted on said satellite in planes intersecting on said spin axis, a pick-up coil mounted with its turns in the plane of one of said current loops to produce a current proportional to variations in the earth's magnetic field, means for amplifying the output of said pick-up coil, and means for applying the output of said amplifier to at least one of said current loops to produce a torque about said spin axis.

6. In a space satellite to be launched with an initial spin about the axis of greatest moment of inertia and with said axis normal to the plane of a desired orbit, means for maintaining the spin of said satellite despite damping influences comprising a current-carrying loop mounted on said satellite in a plane which includes said spin axis, means for sensing variations in the earth's magnetic field experienced by said satellite as it spins about said axis and generating a current proportional to said variations, means for shifting the phase of said current in proportion to its frequency and introducing a maximum phase shift of ninety degrees at a desired spin velocity of said satellite, means for applying the phase-shifted current to said current loop to produce a torque about said spin axis varying with the angular velocity of said satellite, and means for damping rotation of said satellite about axes other than said spin axis.

7. In a space satellite to be launched with an initial spin about the axis of greatest moment of inertia and with said axis normal to the plane of a desired orbit, means for maintaining the spin of said satellite despite damping influences comprising a current-carrying loop mounted on said satellite in a plane parallel to said spin axis, means for sensing variations in the earth's magnetic field experienced by said spinning satellite and generating a current proportional thereto, a low-pass filter having a cut-off frequency proportional to twice the desired angular velocity for said spinning satellite, means for applying the output current from said sensing means to said current loop by way of said low-pass filter, and means for damping rotation of the satellite about axes other than said spin axis.

8. In a space satellite to be launched with an initial spin about the axis of greatest moment of inertia and with said axis normal to the plane of a desired orbit, means for maintaining the spin of said satellite despite damping influences comprising a current-carrying loop mounted on said satellite in a plane parallel to said spin axis, means for sensing variations in the earth's magnetic field experienced by said spinning satellite and generating a current proportional thereto, means for introducing a phase shift in said current proportional to its frequency and reaching a maximum of ninety degrees at the desired angular velocity of said satellite, a saturating amplifier arranged to produce maximum gain for currents less than those produced at the desired angular velocity of said satellite about said spin axis, means for applying the phase-shifted current from said sensing means to said driving loop by way of said saturating amplifier, and means for damping rotation of the satellite about axes other than said spin axis.

9. In a space satellite to be launched with an initial spin about the axis of greatest moment of inertia and with said axis normal to the plane of a desired orbit, means for maintaining the spin of said satellite despite damping influences comprising a pair of current-carrying loops mounted on said satellite in planes which intersect in a line parallel to said spin axis, means for sensing variations in the earth's magnetic field experienced by said spinning satellite and generating a current proportional thereto, means for applying said current to said loops to produce a torque about said spin axis, and at least one loop of conductive material mounted on the satellite in a plane intersecting said spin axis to damp out rotation of the satellite about other than said spin axis through the effective eddy currents generated therein.

10. In a space satellite to be launched with an initial spin about the axis of greatest moment of inertia and with said axis normal to the plane of a desired orbit, means for maintaining the spin of said satellite despite damping influences comprising a pair of current-carrying loops mounted on said satellite in planes which intersect in a line parallel to said spin axis, means for sensing variations in the earth's magnetic field experienced by said spinning satellite and generating a current proportional thereto, means for applying said current to said loops to produce a torque about said spin axis, and antennas mounted on said satellite and symmetrically disposed about said spin axis.

References Cited in the file of this patent
UNITED STATES PATENTS

| | | |
|---|---|---|
| 1,019,544 | South | Mar. 5, 1912 |
| 2,856,142 | Haviland | Oct. 14, 1958 |